United States Patent [19]

Montalvo

[11] Patent Number: 5,008,799
[45] Date of Patent: Apr. 16, 1991

[54] BACK-TO-BACK CAPACITOR CHARGE PUMPS

[76] Inventor: Antonio J. Montalvo, 850 Cole St., San Francisco, Calif. 94117

[21] Appl. No.: 505,292

[22] Filed: Apr. 5, 1990

[51] Int. Cl.[5] .............................................. H02M 3/18
[52] U.S. Cl. ...................................... 363/60; 307/110; 363/59
[58] Field of Search .............................. 363/59, 60, 62

[56] References Cited

U.S. PATENT DOCUMENTS

| | | | |
|---|---|---|---|
| 4,559,548 | 12/1985 | Iizuka et al. | 363/60 |
| 4,636,930 | 1/1987 | Bingham et al. | 307/110 |
| 4,752,699 | 6/1988 | Cranford et al. | 363/60 |
| 4,807,104 | 2/1989 | Floyd et al. | 363/59 |
| 4,812,961 | 3/1989 | Essaff et al. | 363/61 |
| 4,888,677 | 12/1989 | Grimm et al. | 307/110 |
| 4,935,644 | 6/1990 | Tsujimoto | 307/296.2 |

*Primary Examiner*—Steven L. Stephan
*Assistant Examiner*—Jeffrey Sterrett
*Attorney, Agent, or Firm*—Skjerven, Morrill, MacPherson, Franklin & Friel

[57] ABSTRACT

A charge pump circuit is provided comprising a first MOSFET capacitor ("pumping capacitor"), two other MOSFET capacitors ("back-to-back capacitors") connected together with a common junction of the back-to-back capacitor in series with the pumping capacitor, a voltage clamp connected to the common node of all three MOSFET capacitors, and a diode for output of the charge pumped. A number of these charge pump circuits may be cascaded to form a multi-stage charge pump circuit. Each charge pump circuit may attain output voltage higher than the oxide breakdown voltage of each individual MOS capacitor. This charge pump circuit can also operate under low voltage power supply conditions.

12 Claims, 2 Drawing Sheets

BACK-TO-BACK CAPACITOR CHARGE PUMPS

BACKGROUND OF THE INVENTION

1. Field of the Invention

This invention relates to the design of charge pumps, and in particular, to the design of charge pumps in high voltage integrated circuit technology. This invention is also applicable to other integrated circuit technology where low start-up voltage condition is desired.

2. Description of the Prior Art

Charge pumps are circuit elements using the pumping action of diode connected MOSFETs and MOS capacitors to provide a voltage source of higher voltage than the power supplies. The charge pumping effect may be achieved by a MOS capacitor, which is a MOSFET with its source and drain terminals shorted to each other, and with its gate terminal connected to a diode connected MOSFET (known also as a MOSFET diode). A diode connected MOSFET is a MOSFET with its gate and source terminals shorted to each other. By applying an oscillating voltage to the tied source and drain terminals of the MOS capacitor, a successively higher voltage is induced at the source terminal of the MOSFET diode with time, until a steady state voltage is reached.

FIG. 1a shows a two-stage charge pump circuit in the prior art. As shown in FIG. 1a, and throughout the following description, MOS capacitors (e.g. capacitors 120 and 130) are shown to be n-MOSFETs. The use of n-MOSFET in this description is for the purpose of example only. The skilled person in the art will be able to infer from the following description and the accompanying drawings, corresponding circuits using p-MOSFETs.

In FIG. 1a, the source-drain terminal of MOS capacitor 120 is connected to clock input Φ, the gate terminal of MOS capacitor 120 is connected to node 125, which is connected to the gate and drain terminals of NMOS transistor 110, and the source terminal of NMOS transistor 100. The drain terminal of NMOS transistor 100 is connected to a supply voltage Vpp. The source terminal of NMOS transistor 110 is connected to node 135, which is the the gate terminal of MOS capacitor 130. The gate and drain terminals of NMOS transistor 140 are also connected to node 135. The MOS capacitor 130 is driven at it source-drain terminal by clock input $\overline{\Phi}$, which is the non-overlapping complementary signal to clock signal Φ (see FIG. 1b). MOS capacitor 120 and MOSFET diode 110 form the first stage of this charge pump circuit. MOS capacitor 130 and MOSFET diode 140 form the second, and, in this implementation, the output stage of the charge pump circuit. The source terminal of NMOS transistor 140 is tapped as the output terminal $V_{out}$ of this charge pump circuit.

Initially, through NMOS transistors 160 and 100, node 125 is precharged to within the supply voltage VCC less the threshold voltages (Vt) of NMOS transistors 160 and 100.

FIG. 1b shows the non-overlapping and complementary waveforms of clock inputs Φ and $\overline{\Phi}$. When clock input Φ is low, MOS capacitor 120 is on. As Φ goes high, node 125 is capacitively coupled to a voltage equal to its precharge voltage plus the voltage swing of clock input Φ, with some loss due to the parasitic capacitance at node 125. This turns on MOSFET diode 110 which charges up node 135. When clock input Φ goes low, node 125 follows, thus turning off transistor 110. Immediately thereafter, clock input Φ goes high which increases the voltage at node 135 by the voltage swing of clock input $\overline{\Phi}$ times a capacitive coupling ratio. The charging of node 135 turns on MOSFET 140 which charges up $V_{out}$.

Node 125 is precharged to a higher voltage with each successive clock cycle, until this voltage is equal to either ($V_{out}$−Vt) or Vpp, whichever is less, where Vt is the threshold voltage of transistor 100. The maximum output voltage $V_{out}$ of a stage in the pump is equal to the maximum precharge voltage plus the clock voltage $V_\Phi$ times the coupling ratio K less the Vt of the diode connected MOSFET. Thus, the maximum output voltage of this implementation is:

$$V_{out}{}^{max} = V_{pp} + 2(KV_\Phi - V_t)$$

where $$K = \frac{C_{120}}{C_{120} + C_{STRAY, 125}} = \frac{C_{130}}{C_{130} + C_{STRAY, 135}};$$

$C_{120}$ and $C_{130}$ are the capacitances of MOS capacitors 120 and 130 respectively; $C_{STRAY, 125}$ and $C_{STRAY, 135}$ are the parasitic capacitances at nodes 125 and 135 respectively.

A requirement for the initialization of the pumping action is that MOS capacitor 120 must be on; that is, its gate voltage at node 125 must exceed its threshold voltage (Vt). The voltage at node 125 is initially the voltage power supply VCC, less the two threshold voltage drops at transistors 100 and 160. This voltage at node 125 must be greater than the threshold voltage (approximately 0.7 volts) of MOS capacitor 120. Hence, the supply voltage VCC must not fall below 2.1 volts in the worst case.

FIG. 2 shows an application of a charge pump circuit. In FIG. 2, a charge pump circuit 220 is used to modulate node 270 to keep node 260 at constant voltage despite varying current requirements of current source 240 drawing time-varying current $I_{out}$. Voltage $V_{260}$ at node 260 is held to $$V_{260} = V_{ref}\left(1 + \frac{R1}{R2}\right)$$

If node 260 falls too low due to increased current demand, the comparator will enable oscillator 210 and pump the gate terminal of transistor 250 higher, so that transistor 250 can supply the required current at its source terminal 260 to maintain Node 260 at the required voltage $V_{260}$.

In general, the voltage Vmax attainable by an n-stage charge pump is given by:

$$V_{max} = V_{pp} + n(aV - V_t)$$

where:

Vt is the threshold voltage of the MOSFET diode;
Vpp is the supply voltage;
V is the voltage swing in the clock input signal Φ;
n is the number of stages in the charge pump; and
a is the fraction of the capacitance at the gate terminal of the MOS capacitor to the total capacitance of the capacitor gate node, which includes the parasitic capacitance of the MOSFET diode (such as MOSFET diodes 110 & 140). This fraction is typically less than 1.

The charge pump mechanism may be limited, however, if the desired highest voltage is beyond the oxide breakdown voltage of the MOS capacitor. This is because the voltage difference built up across the gate and drain-source terminals of MOS capacitor 120 or 130 may be large enough to exceed the breakdown voltage of the thin gate oxide in the MOS capacitor before the desirable output voltage is reached. In integrated circuit designs, it is generally desirable to have a thin gate oxide. Therefore, the goal of achieving highest voltage in the charge pump circuit is in conflict with the generally desirable goal of having thin gate oxides. In one application, the desirable voltage to be achieved in the charge pump circuit is 17 volts, but the thin oxide breakdown voltage is around 13 volts. In the prior art, voltage clamping circuit elements are used to avoid breakdown by limiting the voltage drop across the gate and source-drain of the MOS capacitor. While breakdown of the MOS capacitor is avoided by the voltage clamp, the output of the charge pump circuit remains limited by the oxide breakdown voltage of the MOS capacitor.

Therefore, it is an object of the current invention to provide a charge pump circuit capable of attaining a higher voltage output than the oxide breakdown voltage across the gate and source-drain terminals of the MOS capacitor.

SUMMARY OF THE INVENTION

By providing in a charge pump circuit MOS capacitors connected "back-to-back", and in series with a MOS capacitor, an output voltage higher than the individual thin oxide breakdown voltage of each MOS capacitor is achieved.

By providing also a voltage clamp at the junction of the pumping MOS capacitor and the common node in the back-to-back MOS capacitors, the initial voltage at the gate terminal of the pumping MOS capacitor is pre-set, thereby ensuring start-up of the charge pump. Furthermore, this voltage clamp reduces the minimum voltage VCC necessary to start the charge pump. The clamp also ensures proper distribution of the voltage across the capacitors in the presence of junction leakage.

BRIEF DESCRIPTION OF THE DRAWINGS

FIG. 1b shows the complementary clock inputs $\Phi$ and $\overline{\Phi}$ used in the charge pump circuit of FIG. 1a.

DETAILED DESCRIPTION

One example of a charge pump capable of delivering an output voltage higher than the breakdown voltage of the pumping MOSFET capacitor is described in copending application entitled "High Voltage Charge Pumps with Series Capacitors" by Colin Bill et al., Ser. No. 505,335, filed on the same day as this application, assigned to Advanced Micro Devices, Inc., also assignee of this application, is hereby incorporated by reference in its entirety. The apparatus described therein is especially suitable when parallel plate capacitors may be readily formed from overlapping traces of interconnect material. In the embodiment of the present invention to be described below, such parallel plate capacitors are not readily formed because the first level of interconnect polysilicon is too thin to form a contact for the capacitor. Otherwise, the present invention may be used. In general, both the apparatus described hereinbelow in accordance with the present invention and the apparatus described therein in the above-mentioned copending application are applicable to provide the high output voltage and low supply voltage operation advantages of the present invention.

n-MOSFETs are used in the following description and claims for illustrative purpose only. Unless specifically called for, p-MOSFET may be used wherever an MOS transistor is shown. Of course, the necessary modifications to the embodiment described herein will be obvious to a person of ordinary skill in the art, when substituting p-MOSFETs for n-MOSFETs.

Figure 3:
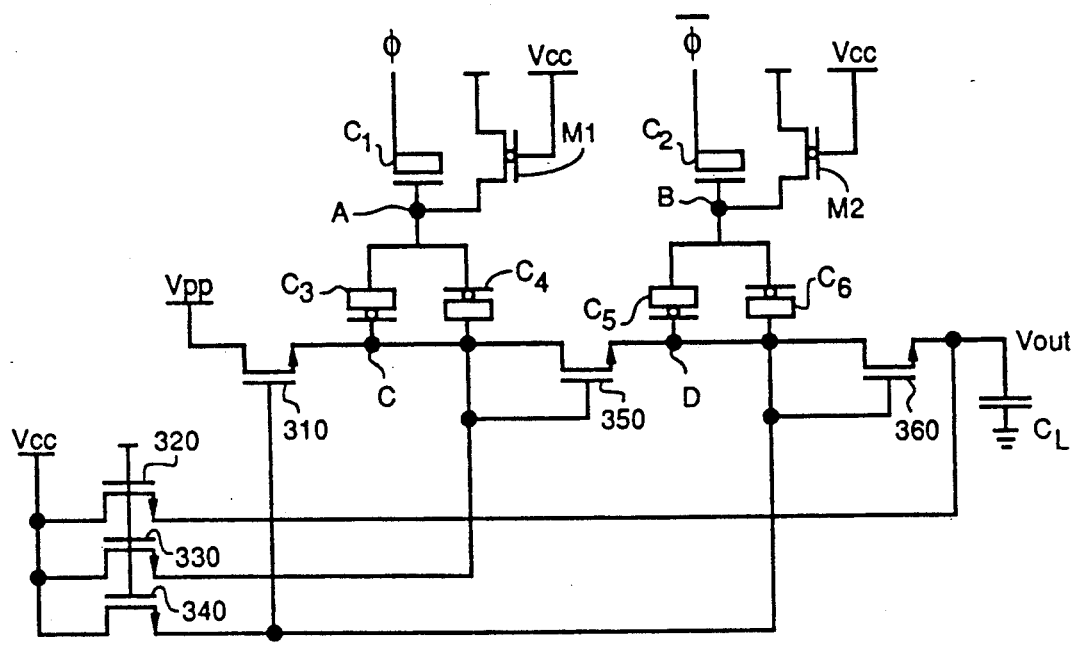
FIG. 3 shows a two-stage charge pump in accordance with the present invention using, in the first stage, back-to-back MOS capacitors C3 and C4, connected to MOS capacitor C1, and back-to-back MOS capacitors C5 and C6, connected to MOS capacitor C2 in the second stage.

FIG. 3 shows an embodiment of the present invention in a two-stage charge pump. The present invention does not restrict, nor is it limited by, the number of stages in the circuit. Stages can be cascaded or eliminated dependent on the output voltage desired. In general, the output voltage attainable is increased by having more stages in the charge pump. Each stage comprises a MOS capacitor (pumping capacitor) connected in series to two other MOS capacitors connected back-to-back, a voltage clamp and a MOSFET diode connected to the common terminal of the back-to-back capacitors away from pumping MOS capacitor. These capacitors are connected to the gate and drain terminals of a diode connected MOSFET as in the prior art. A voltage clamp controls the common node between the pumping capacitor and the back-to-back connected capacitors, and the output voltage for each stage is tapped at the source terminal of the diode connected MOSFET.

As shown in FIG. 3, the first stage comprises MOS capacitors C1, C3 and C4, voltage clamp transistor M1, and diode connected NMOS transistor 350. The source-drain terminal of MOS capacitor C1 is connected to the clock input $\Phi$, with the gate terminal of the MOS capacitor C1 connected to a node labelled "A". Node A is also connected to MOS capacitors C3 and C4 at their source-drain and gate terminals respectively. Hence, the potentials at the gate terminal of MOS capacitor C4 and the source-drain terminal of MOS capacitor C3 are the same. The combination of the three capacitors C1, C3 and C4 forms an equivalent pumping capacitor. The source-drain terminal of MOS capacitor C4 is connected to the gate terminal of MOS capacitor C3 at the node labelled "C", which is connected to the drain and gate terminals of diode connected NMOS transistor 350. Node D is the output terminal of the first stage. It can be readily seen that, if the voltage drop across nodes A and B in either polarity is larger in magnitude than the intrinsic threshold voltage (Vti) of either intrinsic MOS capacitor C3 or C4, then one of these capacitors is in the ON state, while the other capacitor is in the OFF state.

Intrinsic transistor M1 acts as a voltage clamp for node A. The gate and drain terminals of transistor M1 are connected to the power supply VCC and the source terminal of transistor M1 is connected to the node A. The voltage of node A may fluctuate above the voltage (VCC−Vti), because transistor M1 is on (i.e. conducting) if node A falls below the voltage (VCC−Vti). Conversely, if node A is pumped above the voltage (VCC−Vti), transistor M1 is off.

The second stage of the two-stage pump shown in FIG. 3 is formed by the voltage clamp transistor M2, MOS capacitors C2, C5 and C6, and transistor 360. This second charge pump stage functions identically to the first stage charge pump described above. The clock input $\overline{\Phi}$ for this stage is the non-overlapping complementary signal to the clock input $\Phi$ of the first stage. The common node between the MOS capacitor C2 and the back-to-back connected MOSFET capacitors C5 and C6 is labelled "B". The output voltage of the second stage is labelled "$V_{out}$".

For transistors M1 and M2 to act as voltage clamps for nodes A and B, enhancement or intrinsic mode transistors are preferred. Because of these voltage clamps M1 and M2, the minimum voltages at nodes A and B are at the supply voltage VCC, less the threshold voltage (Vti) of the associated voltage clamp transistor M1 or M2. If M1 and M2 are intrinsic transistors, then their threshold voltages Vti are each around 0.1 volt. To ensure MOS capacitor C1 to be in the ON state at the onset of charge pumping, supply voltage VCC need only be maintained such that the drop across MOS capacitor C1 is greater than its threshold voltage, i.e. (VCC−Vti)>Vt, or approximately 0.8 volts, as compared to 2.1 volts in the prior art. Hence, the present invention is more tolerant to power supply fluctuation than the prior art circuit shown in FIG. 1a.

The gate terminal of diode connected transistor 350 (MOSFET diode) is connected to node C and also to the source terminal of transistor 330, whose drain and gate terminals are connected to the power supply VCC. Supply voltage VCC in this embodiment is about 5 volts. Transistor 320's gate and drain terminals are connected to the power supply VCC.

Node C is also connected to the source terminal of transistor 310, whose drain terminal is connected to a supply voltage Vpp. Supply voltage Vpp in this embodiment is about 12 volts. The gate terminal of transistor 310 is connected to the source terminal of transistor 340.

Initially, the nodes C and D are at the supply voltage VCC, less the threshold voltages of transistors 330 and 340 respectively. (Hence, $VC = VCC - 2Vt$). The nodes A and B are at supply voltage VCC, less the threshold voltages of intrinsic transistors M1 and M2 respectively ($VA = VCC - Vti$). At this voltage, the MOSFET capacitors C1 and C2 are each in the ON state. As mentioned previously, Vti is smaller than Vt; therefore, initially the voltage at node A is greater than the voltage at node C (VA>VC). Under this condition, MOS capacitor C4 is in the ON state, and MOS capacitor C3 is in the OFF state. Similarly, the initial voltage at node B is greater than the voltage at node D (VB>VD), thereby rendering MOS capacitors C6 and C5 in the ON and OFF states respectively.

Figure 1A:
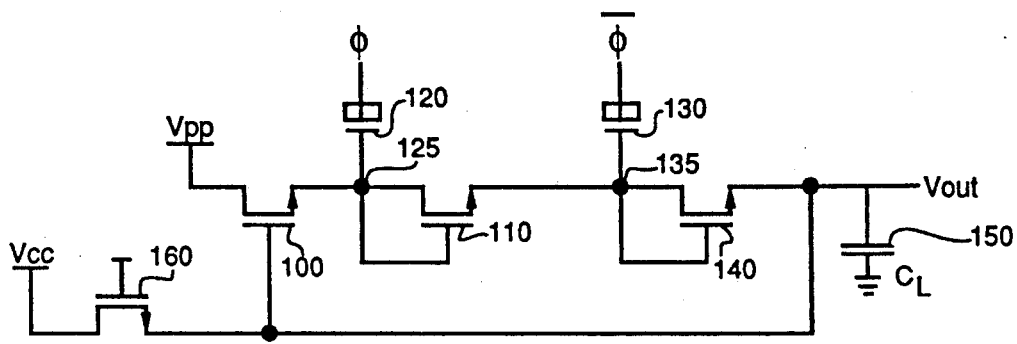
FIG. 1a shows a prior art charge pump circuit using two MOS capacitors 120 and 130 and MOSFET diodes 110 and 140.
Figure 1B:
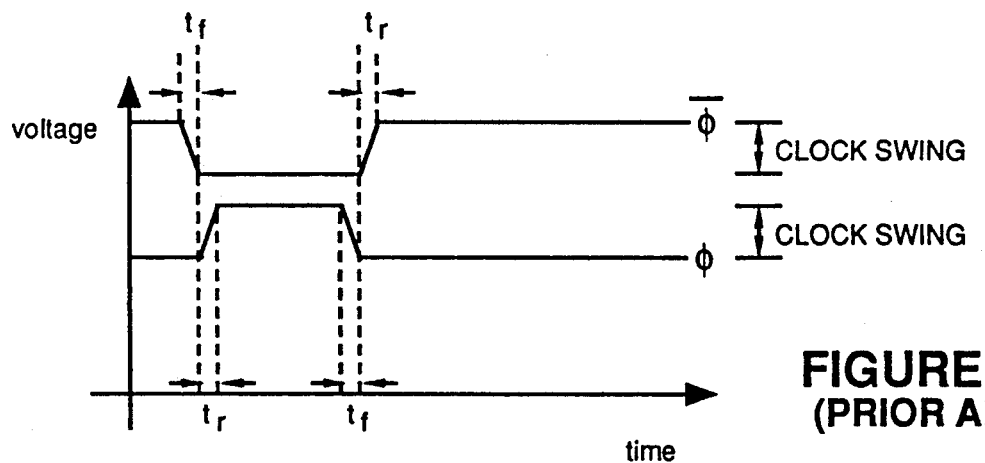
Figure 2:
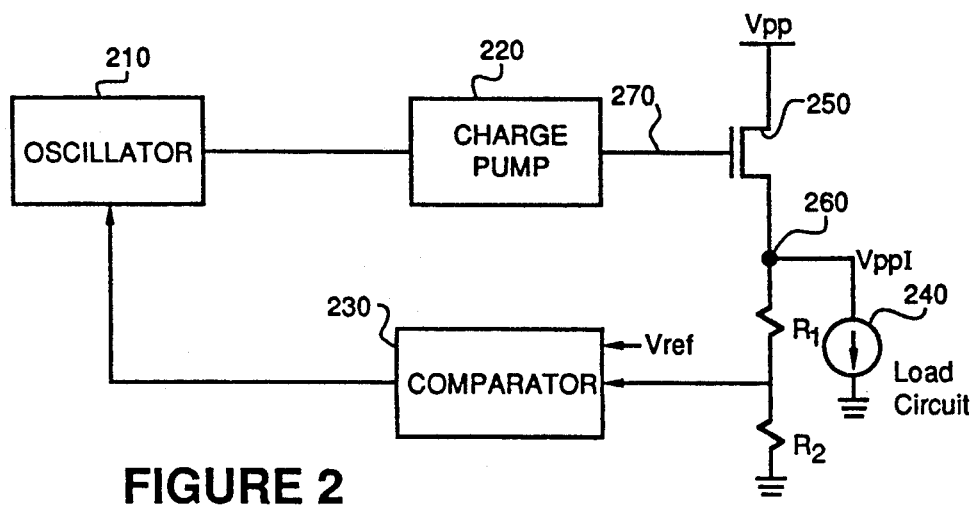
FIG. 2 shows an application of a charge pump circuit.

This pump operates in a manner similar to the circuit in FIG. 1a with the pumping MOS capacitor 120 being replaced by the series combination of MOS capacitor C1 and the parallel combination of MOS capacitors C3 and C4 in the first stage. Likewise MOS capacitors C2, C5 and C6 replaces MOS capacitor 130 in the second stage. As the voltages of nodes C and D increase, MOS capacitors C4 and C6 are turned off and MOS capacitors C3 and C5 are turned on, hence forming the capacitance (i.e. equivalent capacitance formed by MOS capacitors C1 and C3, and equivalent capacitance formed by MOS capacitors C2 and C5) necessary to pump to high voltage. There is a time when the voltage difference between nodes A and C, i.e. voltage (VA−VC) is small (in fact, smaller than either the threshold voltage of MOS capacitors C3 and C4), during which neither MOS capacitor C2 nor C4 is strongly on, so that the total pumping capacitance becomes quite small. Once this period is passed, i.e. the voltage difference between nodes A and C is greater than either threshold voltage of MOS capacitors C3 and C4, the pump will again become quite robust. This window of inefficiency is reduced if the threshold voltages of these capacitors are made small. Thus, in this implementation, the back-to-back capacitors C3, C4, C5 and C6 are chosen to be intrinsic devices.

Once the voltage at node C exceeds the voltage at node A (i.e., VC>VA) and MOS capacitor C3 is in the ON state and the pump is approaching its maximum voltage, the voltage at node A is given by the expression $$VA = VC\left(\frac{C3}{C1 + C3}\right),$$

when the clock signal $\Phi$ is low, since voltage clamp M1 is turned off by the voltage at node A exceeding the voltage (VCC−Vti). However, leakage current causes charge loss at node A through the source/drain terminal of MOS capacitor C3 and the source terminal of transistor M1. This charge loss is not replenished because, without a diode to precharge and discharge Node A, there can be no pumping action. Thus, the voltage clamp M1 is necessary to keep the minimum voltage at node A equal to VCC−Vti. If node A is not clamped, the voltage at node A may fall to ground and the voltage increase due to the pumping action would be seen across MOS capacitor C3, thus defeating the purpose of stacking the capacitors.

In one embodiment, the capacitance values for MOS capacitors C1, C3 and C4 are respectively 1.4 pF, 1.4 pF and 0.25 pF, for an output loading $C_L$ of 6 pF. The capacitance of MOS capacitor C4 may be made small because it is typically in the ON state only at the start-up period of pumping. At other times, the high voltage accumulated during the pumping process is evenly distributed across MOS capacitors C1 and C3.

Because the back-to-back MOS capacitors can be made from MOSFETs, the cost savings resulting from being able to provide a higher voltage supply without having to require an external higher voltage source input is significant. Being able to provide the higher voltage supply from MOSFETs and not another kind of device also provides simplicity both in design and in the manufacturing process.

The above detailed description is intended to be exemplary only and not limiting. A person skilled in the art will be able, in consideration of the above description and the accompanying drawings, to suggest modifications and variations within the scope of the present invention.

I claim:
1. A charge pump apparatus comprising:
   first capacitor means for providing capacitance, said first capacitance means having first and second leads, and said first capacitor means being of the type having first and second mutually exclusive states, such that when the voltage on said first lead of said capacitor means exceeds the voltage on said second lead of said capacitor means by a threshold voltage, said capacitor means is in the first state, and said capacitor means is in the second state otherwise;

second capacitor means for providing capacitance, said second capacitor means also having first and second leads, and first and second states as in said first capacitor means, said second lead of said second capacitor means connected to said first lead of said first capacitor means forming a common input lead, said second lead of said first capacitor means and said first lead of said second capacitor means forming a common output lead;

charge pumping means having an input lead and an output lead, the voltage on said output lead increases in response to a signal received on said input lead, said output lead of said charge pumping means connected to said common input lead of said first and second capacitor means;

diode means for transferring voltage unidirectionally, said diode means having first and second leads, said first lead of said diode connected to said common output lead of said first and second capacitor means, and said second lead of said diode means forming an output lead for said charge pump apparatus, such that current flows from said first lead of said diode means to said second lead of said diode means when the voltage on said first lead of said diode exceeds the voltage on said second lead of said diode; and voltage clamp means connected to said output lead of said charge pumping means, for ensuring that voltage on said output lead of said charging means does not fall below predetermined voltage.

2. A charge pump apparatus as in claim 1, wherein said charge pumping means comprises an MOS capacitor having gate, source and drain terminals, said gate terminal being said output lead of said charge pumping means, and said source and drain terminals connected together to form said input lead of said charge pumping means.

3. A charge pump apparatus as in claim 1, wherein said voltage clamp means comprises a transistor having gate, source and drain terminals, said drain terminal connectable to a power supply terminal and said gate terminal, said source terminal connected to said output lead of said charge pumping means.

4. A charge pump apparatus as in claim 1, wherein said first and second capacitor means each comprises a MOSFET transistor having gate, source and drain terminals, said gate terminal forming said first lead of said capacitor means, and said source and drain terminals connected together to form said second lead of said capacitor means.

5. A charge pump apparatus as in claim 1, wherein said diode means comprises a transistor having gate, source and drain terminals, said drain terminal of said transistor connected to said gate terminal of said transistor.

6. A charge pump apparatus as in claim 1, wherein said charge pumping means comprises an MOS capacitor having gate, source and drain terminals, said gate terminal of said MOS capacitor being said output lead of said charge pumping means, and said source and drain terminals of said MOS capacitor connected together to form said input lead of said charge pumping means, and wherein said voltage clamp means comprises a transistor having gate, source and drain terminals, said drain terminal of said transistor connectable to a power supply terminal and said gate terminal of said transistor, said source terminal of said transistor connected to said output lead of said charge pumping means, said power supply need only having voltage higher or equal to the sum of the threshold voltage of said MOS capacitor and the threshold voltage of said transistor.

7. A charge pump apparatus comprising a plurality of charge pump elements, each charge pump element having an input lead and an output lead, said charge pump apparatus formed by cascading said plurality of charge pump elements, and wherein each charge pump element comprises:

first capacitor means for providing capacitance, said first capacitance means having first and second leads, and said first capacitor means being of the type having first and second mutually exclusive states, such that when the voltage on said first lead of said capacitor means exceeds the voltage on said second lead of said capacitor means by a threshold voltage, said capacitor means is in the first state, and said capacitor means is in the second state otherwise;

second capacitor means for providing capacitance, said second capacitor means also having first and second leads, and first and second states as in said first capacitor means, said second lead of said second capacitor means connected to said first lead of said first capacitor means forming a common input lead, said second lead of said first capacitor means and said first lead of said second capacitor means forming a common output lead;

charge pumping means having an input lead and an output lead, the voltage on said output lead increases in response to a signal received on said input lead, said output lead of said charge pumping means connected to said common input lead of said first and second capacitor means;

diode means for transferring voltage unidirectionally, said diode means having first and second leads, said first lead of said diode forming an input lead of said charge pump element, said first lead of said diode also connected to said common output lead of said first and second capacitor means, and said second lead of said diode means forming an output lead for said charge pump element, such that current flows from said first lead of said diode means to said second lead of said diode means when the voltage on said first lead of said diode exceeds the voltage on said second lead of said diode; and voltage clamp means connected to said output lead of said charge pumping means, for ensuring that said voltage output lead of said charging means does not fall below predetermined voltage.

8. A charge pump apparatus as in claim 7, wherein each of said charge pumping means comprises an MOS capacitor having gate source and drain terminals, said gate terminal being said output lead of said charge pumping means, and said source and drain terminals connected together to form said input lead of said charge pumping means.

9. A charge pump apparatus as in claim 7, wherein each of said voltage clamp means comprises a transistor having gate, source and terminals, said drain terminal connectable to a power supply and said gate terminal, said source terminal connected to said output lead of said charge pumping means.

10. A charge pump apparatus as in claim 7, wherein each of said diode means comprises a transistor having gate, source and drain terminals, said drain terminal connected to said gate terminal, said drain terminal being said first lead of said diode means, said source terminal being said second lead of said diode means.

11. A charge pump apparatus as in claim 7, wherein said first and second capacitor means each comprises a MOSFET transistor having gate, source and drain terminals, said gate terminal forming said first lead of said capacitor means, and said source and drain terminals connected together to form said second lead of said capacitor means.

12. A charge pump apparatus as in claim 7, wherein each charge pumping means comprises an MOS capacitor having gate, source and drain terminals, said gate terminal of said MOS capacitor being said output lead of said charge pumping means, and said source and drain terminals of said MOS capacitor connected together to form said input lead of said charge pumping means, and wherein each voltage clamp means comprises a transistor having gate, source and drain terminals, said drain terminal of said transistor connectable to a power supply terminal and said gate terminal of said transistor, said source terminal of said transistor connected to said output lead of said charge pumping means, said power supply need only having voltage higher or equal to the sum of the threshold voltage of said MOS capacitor and the threshold voltage of said transistor.

* * * * *

UNITED STATES PATENT AND TRADEMARK OFFICE
CERTIFICATE OF CORRECTION

PATENT NO.   : 5,008,799
DATED        : April 16, 1991
INVENTOR(S)  : Antonio J. Montalvo It is certified that error appears in the above-identified patent and that said Letters Patent is hereby corrected as shown below:

Column 1, line 44, delete first occurance of "the".

Column 1, line 47, delete "it" and insert --its--.

Column 2, line 1, delete "$\Phi$" and insert --$\overline{\Phi}$--.

Column 2, line 24, after "capacitors" insert --120--.

Signed and Sealed this

Thirteenth Day of October, 1992

Attest:

DOUGLAS B. COMER

*Attesting Officer*      Acting Commissioner of Patents and Trademarks